United States Patent [19]
Ulrich

[11] 3,917,410
[45] Nov. 4, 1975

[54] APPARATUS FOR MEASURING THE REFRACTIVE INDEX OF LIQUIDS OR GASES

[76] Inventor: Helmut Ulrich, Waldhornstrasse 27, 8 Munich 50, Germany

[22] Filed: Apr. 29, 1974

[21] Appl. No.: 465,155

Related U.S. Application Data

[63] Continuation-in-part of Ser. No. 275,729, July 27, 1972, abandoned.

[30] Foreign Application Priority Data
July 28, 1971 Germany............................ 2137842

[52] U.S. Cl. ................ 356/133; 250/573; 250/227; 356/128
[51] Int. Cl.²......................................... G01N 21/46
[58] Field of Search ........... 356/128, 133, 132, 131; 350/96 R, 192; 250/216, 227, 573–577

[56] References Cited
UNITED STATES PATENTS

| | | | |
|---|---|---|---|
| 2,740,318 | 4/1956 | Sharp | 350/192 X |
| 3,282,149 | 11/1966 | Shaw et al. | 250/227 X |
| 3,552,860 | 1/1971 | Granquist | 356/128 |
| 3,612,696 | 10/1971 | Broerman | 356/128 |
| 3,639,770 | 2/1972 | Zizelman | 356/133 X |
| 3,683,196 | 8/1972 | Obenhaus | 250/227 |

OTHER PUBLICATIONS
Freeman, IBM Tech. Discl. Bulletin, Vol. 5, No. 1, June 1962, p. 87.

*Primary Examiner*—Walter Stolwein
*Attorney, Agent, or Firm*—Griffin, Branigan and Butler

[57] ABSTRACT

There is herein disclosed a light conductor apparatus for measuring the refractive index of fluids and determining the mixture-ratios of the fluid components and the fluid temperature. A end-face window of a light conductor has both a radiation source and a photosensitive member coupled thereto. A portion of the light conductor's surface has a surface-of-rotation which has a progressively decreasing radius of curvature extending toward a vertex-tip, measuring, surface area. Light which is reflected from the vertex-tip, measuring, surface area to the photosensitive member provides an indication of an unknown refractive index of a fluid adjacent to the vertex-tip, measuring, surface area.

12 Claims, 14 Drawing Figures

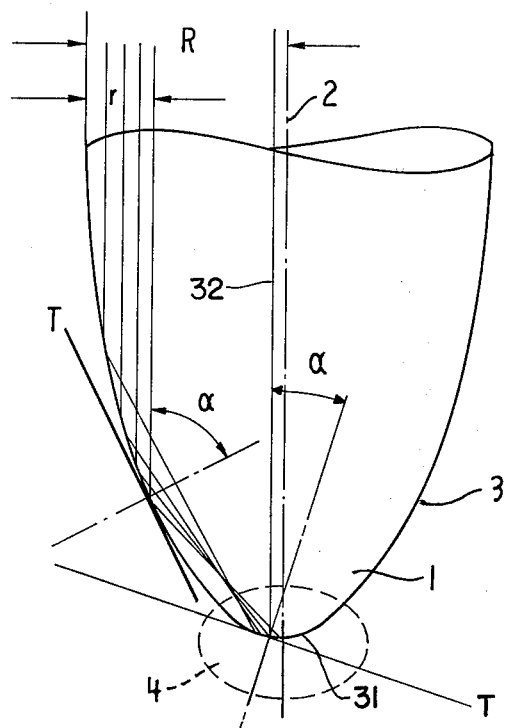
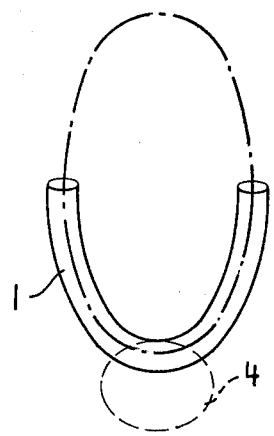
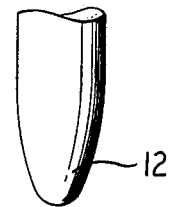
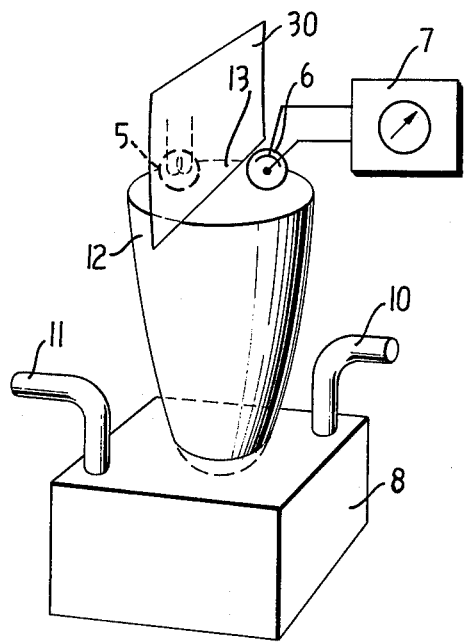
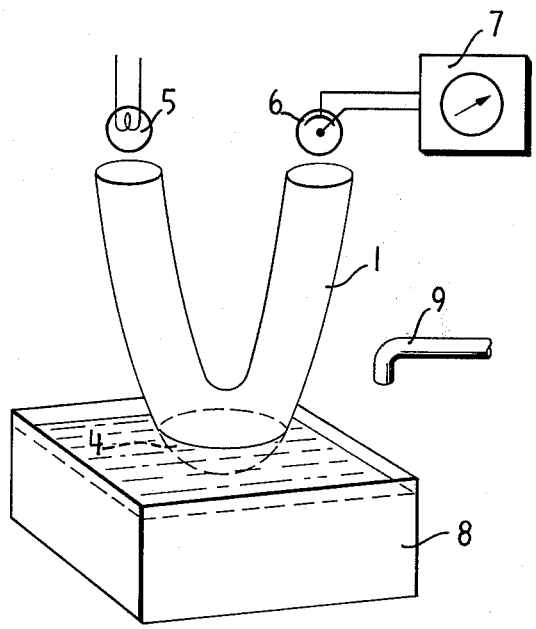
FIG. 1
FIG. 2a
FIG. 3a
FIG. 3
FIG. 2

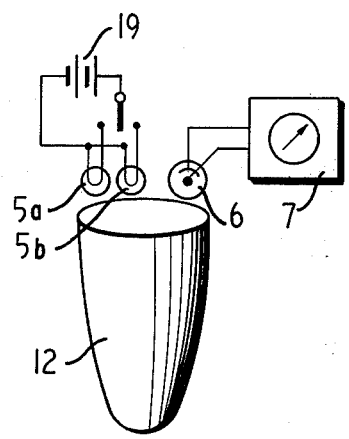 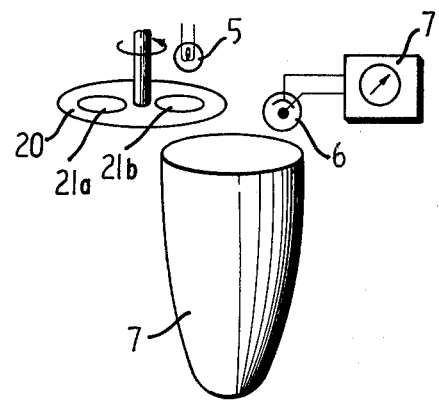
FIG. 7  FIG. 9
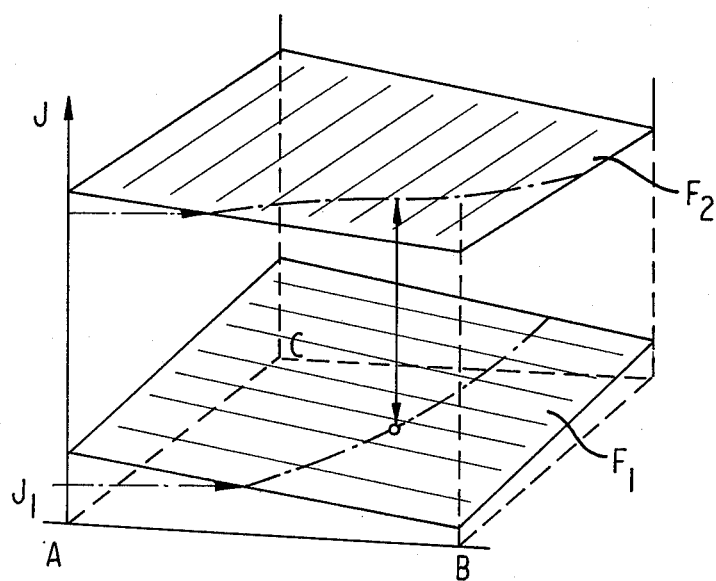
FIG. 6

APPARATUS FOR MEASURING THE REFRACTIVE INDEX OF LIQUIDS OR GASES

BACKGROUND OF THE INVENTION

This is a continuation-in-part of application Ser. No. 275,729, filed July 27, 1972, now abandoned, which, in turn, claims foreign priority on a German application filed on July 28, 1971.

This invention relates to devices for measuring the refractive index of liquids or gases, as well as to devices utilizing the dependence of the refractive index upon predetermined physical values for exactly measuring these physical values.

Known means of this type are constructed substantially so that a predetermined path of rays through a substance concerned is tested and geometrically accurately measured.

A disadvantage of the known measuring equipments is that a defined light beam must be produced and this light beam, as well as the interfaces of the material to be tested, must be accurately aligned with respect to each other if a reproduceable measurement is to be carried out. Thus, the surfaces of the body to be examined with respect to its refractive index can by no means be allowed to have any deliberate configuration. Further external radiation sources must be shielded by special means in order to avoid a falsification of the resulting measurements.

The object of the invention is to permit the measuring of the refractive index of a liquid or gas without examination of a geometric path of rays. By the determination of refractive coefficients, it should be also possible to ascertain the mixing ratios of liquid or gas mixtures.

SUMMRY OF THE INVENTION

According to the present invention, a source of radiation and a photo-sensitive element are each coupled to an end face window region of a light-conductor. The light conductor has a surface-of-revolution shaped conducting surface extending from the end face window region toward a vertex-tip measuring, surface area of the light-conductor. The conducting surface has a progressively decreasing radius of surface curvature until it merges at the vertex-tip, measuring, surface area, without the radius of surface curvature becoming zero (having an edge or a point) at this vertex-tip, measuring, surface area. Further, a substance having a refractive index to be determined and the light conductor having a constant or known refractive index, are adjacent each other at the phase limit in the vertex-tip, measuring, surface area.

It was found that, by the just briefly described conducting surface configuration of a light-conductor, quite a small vertex-tip, measuring, surface area of said light-conductor is decisive for the transmission of light from the source of radiation to the photo-sensitive means, while the remaining conducting surface portions of the light-conductor exert a relatively small influence on such light transmission. It is therefore possible, by changing the conditions in the narrow-limited vertex-tip, measuring, surface area of the light-conductor, to achieve a corresponding modulation — dependent upon the measured value — of the light current received by the photo-sensitive element, without a falsification of the measured result by conditions outside of the vertex-tip, measuring, surface area.

An essential advantage of shaping the surface portions of the light-conductor adjacent the vertex-tip, measuring, region with a progressively decreasing radius of curvature is that, based on the total light current introduced, a maximum light current can be conducted via the vertex-tip, measuring, surface area to the photo-sensitive element whereby an extremely sensitive and reliably operating measuring apparatus is provided.

If the light conductor is a bent light conductor bar coupled at one end to a source of radiation and at the other end to the photo-sensitive element, the bend may be selected to correspond to an asymptotic curve such as a hyperbola, a funicular curve, a parabola or an ellipse half, while the measuring surface area is located in the vertex of the bend.

According to another advantageous embodiment, the light-conductor is at least partially formed in the shape of a rotational body (a surface of revolution), for example, corresponding to part of a hyperboloid, paraboloid or ellipsoid, while the vertex region of this body again constitutes the measuring surface area. The source of radiation as well as the photo-sensitive element are arranged at an opposite end-face window of said body.

Yet the invention covers also embodiments in which the light-conductor is a hollow space filled with material to be tested and having the above described configuration or profile.

Since the refractive index of a mixture of a plurality of components notoriously depends upon each respective mixture ratio, the mixture ratio can be directly calculated or derived from the refractive index measuring result for systems consisting of two mixture components.

Due to the differing wavelength dependence of the refractive coefficients of material mixtures, also the mixture ratios in mixtures consisting of three components can be ascertained by equipment according to the invention in that measurements with respect to the radiation of different wavelengths are carried out alternately or simultaneously. Finally, it is to be noted here that, in view of the temperature dependence of the refractive index, equipment according to the invention is adapted so that simultaneously with, or instead of, the indication of a mixture ratio it also can indicate or derive a temperature value.

Useful embodiments of the invention are moreover subject matter of the attached claims.

The invention will be explained hereinafter in greater detail in the light of a number of exemplary embodiments.

BRIEF DESCRIPTION OF THE DRAWINGS

FIG. 1 is a schematic side view, partly in section, of the front of a light-conductor of an apparatus according to the invention for elucidation of the basic concept;

FIG. 2 is a schematic perspective view of an embodiment of the invention;

FIG. 2a is a schematic view of a different embodiment of the light-conductor for an apparatus of the invention according to FIG. 2;

FIG. 3 is a perspective schematic view of another embodiment of the invention;

FIG. 3a is a schematic view of another embodiment of a light-conductor for an apparatus according to FIG. 3;

FIG. 6 is a three-dimensional graphic representation for elucidation of the mode of operation of an apparatus for determining the mixture ratios of substance mixtures consisting of three components;

FIG. 7 is a greatly simplified view of an apparatus for determining the mixture ratio and/or the temperature of a mixture of substances;

FIGS. 9 to 12 are further embodiments of the invention similar to that of FIG. 7.

DETAILED DESCRIPTION OF EMBODIMENTS

Figure 4:
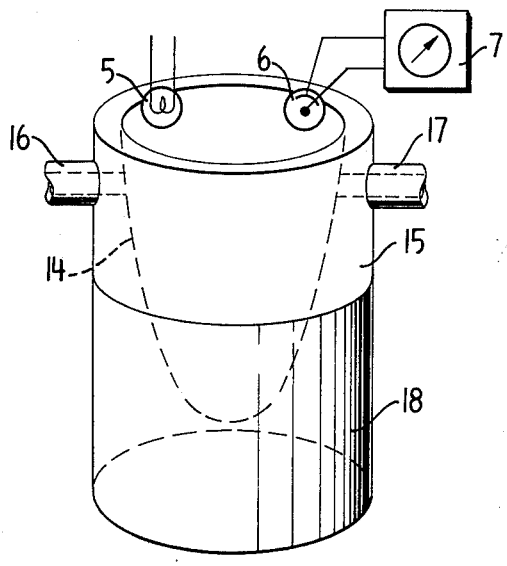
FIG. 4 is a perspective schematic view of a further embodiment of the invention.

Viewing a beam of rays downwardly directed parallel to an axis 2 in a light-conductor body 1 corresponding to part of an ellipsoid and shown in FIG. 1, it can be seen that those rays 32 extending near to the axis 2 and having an angle $\alpha$ relative to the normal to the tangential surface T smaller than the limit angle of total reflection, will depart from the light-conductor body 1 already upon first impingement on the phase limit 3. All of the rays impinging on the surface 3 of the body 1 at a smaller angle to the tangential plane and extending a greater distance from the axis 2 initially undergo a first total reflection within the light-conductor body 1, but upon subsequent impingement against the surface of the light-conductor body 1, they remain in this body only when also this time the value for the angle is not smaller than the critical value.

Now, it turns out that a favorable ratio of the total introduced radiation corresponding to the value R, to radiation completely reflected and transmitted back again in the direction of the axis corresponding to the value r, can be achieved when the surface 3 of the light-conductor body 1 merges with progressively decreasing radius of surface curvature into a vertex tip 31 without formation of a pointed tip or an edge. Of course these considerations apply not only for asymptotic ellipsoid-like, hyperboloid-like or paraboloid-like rotational bodies but also for flat, disc-like light-conductor bodies which e.g. in a side view have a shape corresponding to FIG. 1, or again for light-conductor rods bent in accordance with a cone-section curve or a funicular curve or the like, as will be discussed hereinafter in conjunction with FIGS. 2 and 2a of the drawings. At any rate, what these embodiments of light-conductor bodies have in common is that the conditions at the phase limit between the light-conductor body and the environment at a narrow-limited vertex-tip, measuring, surface area 4 are determinative for the reflection of radiation directed toward the vertex end of the light-conductor body. In this regard, at this very place, all light rays normally returned to a radiation-sensitive means undergo an inner reflection at least once.

In the embodiment according to FIG. 2 the light-conductor body 1 has the shape of a light-conductor bar bent in conformity to a parabola part, to one end of which a radiant source 5 is coupled while a radiation-sensitive element 6 is coupled to the other end thereof. The radiation-sensitive element 6, for example a photo-cell, is connected to a measuring device 7. An amplifier may be series connected to the measuring device in front thereof or be located within the measuring device.

Beneath the light-conductor body 1 is located a container 8 into which a liquid to be tested can be introduced through a pipe line 9. The liquid wets the vertex-tip, measuring, surface area 4 of the light-conductor body 1 and causes the indication of the measuring device 7 to vary in response to the refractive index of the liquid disposed in the container 8 or — on account of the dependence of the refractive index upon these values — in response to the temperature or to the mixture ratio so that in each case a corresponding calibration of the measuring device 7 can be made.

In lieu of the parabolic shape, the light-conductor body 1 can be also bent according to a hyperbolic shape or according to the half of an ellipse, as FIG. 2a of the drawings show.

The container 8 of the embodiment according to FIG. 2 may also be closed around the measuring point surface area 4 of the light-conductor body 1 so that the arrangement will be suited for testing gaseous materials or vapors. To this end, the container 8 may be provided with corresponding connecting means 10 and 11, as shown schematically for the embodiment according to FIG. 3. Yet in contradistinction from the embodiment according to FIG. 2, here the light-conductor body has the shape of a rotational ellipsoid 12 having an end face window 13 — which is opposite the vertex — coupled to both a radiant source 5 and a radiation-sensitive element 6. Of course the arrangement of the radiant source and of the radiation-sensitive element relative to the end face of the light-conductor body is only schematically indicated. Said members can be embedded in bores or recesses of the light-conductor body so that the delivered or received radiation will be fully utilized or collected as completely as possible. To illustrate this a light shield 30 is depicted in FIG. 3 to prevent light from traveling directly from the radiant source 5 to the radiation sensitive element 6.

The radiant source 5 and the radiation-sensitive element 6 need not be disposed directly adjacent the measuring point surface area 4 but may be located at the end of a rod-like extension portion of the light-conductor body 1. However, it is important that the portion comprising the vertex-tip, measuring, surface area and the rod-like cylindrical portion of the light-conductor body leading to the vertex tip are continuously joined as shown in FIG. 3a. That is, in the direction toward the vertex, the surface portions have continually decreasing radii of curvature until they are joined at the vertex.

FIG. 4 shows a device in which the light-conductor body 14 has the shape of a cavity provided in a vessel 15 consisting of a material of known or constant refractive index. The cavity 14 can be connected, via a supply line 16 and a discharge line 17, with a flow of a substance to be tested with respect to its refractive index or to the mixture ratio of its components. In the lower region of the vessel 15 this vessel is provided at its outside with a light-absorbing layer 18.

The cavity which is filled with the material to be tested and which, with its upper opening, is facing the radiant source 5 and the radiation-sensitive element 6 with the measuring device 7 connected thereto, corresponds in its mode of operation to the light-conductor body 12 of the embodiment according to FIG. 3.

Figure 5:
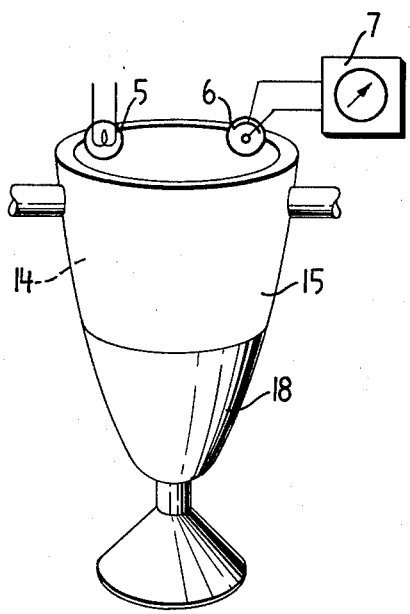
FIG. 5 is a perspective schematic view of another embodiment of the invention.

The embodiment shown in FIG. 5 differs from that according to FIG. 4 only in that the shape of the vessel 15 is adapted to the configuration of the inner cavity 14 and in that, accordingly, also the light-absorbing layer 18 corresponds directly to the shape of cavity 14.

If a material to be tested as regards its refractive index or mixture ratio of its components contains more than two mixture components, then the indication delivered by the measuring device 7 is no longer unambiguous but in the case of three mixture components corresponds to an infinite number of combinations which — in the case of a predetermined wavelength of the light of the radiant source 5 — lead to a certain intensity of the light current received at the radiation-sensitive element 6, and hence to a certain electrical current energizing the measuring device 7.

When the mixture ratio with respect to the components A and B for one thing and with respect to the components A and C for another thing is plotted in one plane, as shown in FIG. 6, and when the current indication of the measuring device 7 for the respective mixture ratio is co-ordinated as a height to the individual points, then for one particular wavelength there results a characteristic surface $F_1$, and for another wavelength there results for example a characteristic surface $F_2$.

Figure 8:
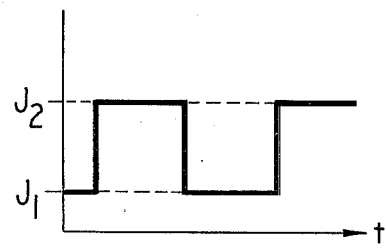
FIG. 8 is a graphic representation of the indication of the measuring device of the apparatus according to FIG. 7.

When a particular indication is received at the measuring device 7 for a predetermined wavelength of the radiant source 5 being used, this means a definition of a certain contour line of constant height on the characteristic surface $F_1$ or $F_2$, respectively. Now, when one wavelength and another wavelength are alternately sent from the radiant source 5 into the light-conductor body, then an indication having the shape shown e.g. in the time diagram of FIG. 8, is received at the measuring device 7. This signifies that, by measuring with two different wavelengths, either successively or simultaneously, points of the contour lines according to FIG. 6 corresponding to the actual mixture ratio of the material to be tested, can be determined. This is the point of intersection of the contour lines of the characteristic surfaces $F_1$ and $F_2$ in a plan view.

Instead of the concentration or the mixture ratio respecting three components, also the mixture ratio respecting two components and additionally the temperature of a substance consisting of such two mixture components can be determined by the same arrangement because the temperature just as a third mixture component influences the magnitude of the refractive index.

FIG. 7 schematically shows a device in which two radiant sources 5a and 5b are provided, which are alternately connected to a voltage source 19 so that the light-conductor body 12 is impinged once with light of a first wavelength and subsequently with light of a second wavelength. The measuring device 7 then provides the sequence of indication values which is schematically reproduced in FIG. 8 and from which the mixture ratios and/or the temperature can be determined in accordance with the above considerations.

An alternating impingement of the light-conductor body 12 with light of differing wavelengths can be achieved according to the embodiment of FIG. 9 also by filter disc 20 placed in rotation by a motor and having filter sectors 21a and 21b which, during rotation of the filter disc, alternatingly come into the radiation path between the radiant source 5 and the light-conductor body 12.

Figure 10:
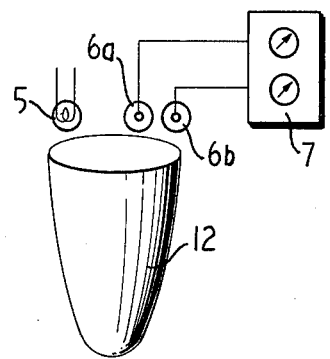
Figure 11:
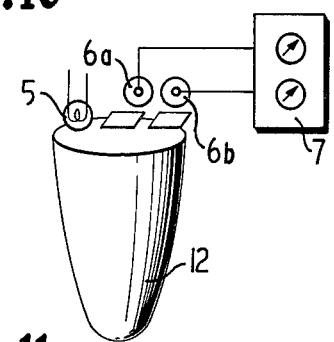
Figure 12:
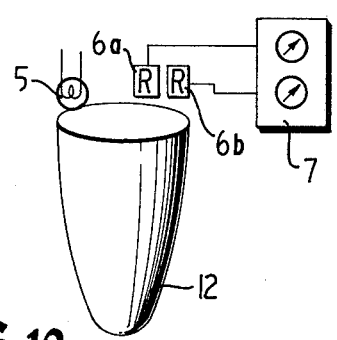

As shown in FIGS. 10 to 12, however, also a radiant source 5 may be used which impinges the light-conductor body 12 with radiation containing a plurality of different wavelengths appearing simultaneously. For deriving two indications each corresponding to a different wavelength, in these cases are provided two radiation-sensitive elements 6a and 6b instead of one single radiation-sensitive element. The embodiment according to FIG. 10, for example, uses photocells of a responsive sensitivity differing as regards the wavelength, i.e. a germanium diode and a silicon diode.

In the embodiment according to FIG. 11 photocells of equal sensitivity are provided, but differing colour filters are arranged thereahead so that, again, a responsivity behavior of the individual radiation-sensitive elements is resulting which is different as regards the wavelengths. The embodiment according to FIG. 11 can also be modified in a manner not shown such that, similarly to the considerations in connection with FIG. 9 as regards the radiant source, a rotating filter disc is placed in front of the radiation-sensitive element so that two indications each associated with a respective wavelength value appear in time sequence at a single measuring instrument.

Finally, FIG. 12 shows an arrangement wherein the radiation-sensitive elements 6a and 6b are formed of photo-sensitive resistors having differing maximum sensitivity.

In this connection, some further advantages of the devices according to the invention should particularly be emphasized. On account of the profiling of the surface of bar-like or disc-like or rotation-symmetrical light-conductor bodies, as was elucidated with reference to FIG. 1, it is achieved that, for the attenuation of the light current from a radiant source to a light sensitive or radiation-sensitive element, the conditions at the phase limit in a quite narrowly limited surface area, which all of the light rays impinge at least once, are determinative for the measurement. In this manner there is achieved a very clear indication, a high sensitivity of the arrangement and a small tendency to failure for example by reason of differing immersion depth or inclined position or the like.

Thanks to the simple structure of the light-conductor body and to the possibility of interposing a longer light-conductor section for connecting to the radiation source and to the radiation-sensitive means, the measurements can be carried out in environments of extreme temperature and/or pressure conditions as well as in explosion-endangered surroundings.

In view of these properties, the apparatus according to the invention also provides the possibility e.g. of determining the vapor state in high-pressure vessels with a minimum of technical expenditure, wherein a simple bar lead through for the light-conductor body represents the sole connecting way to an environment of extreme conditions.

I claim:

1. Apparatus for measuring the refractive index of fluids contained in a fluid retainer, comprising:
   a means forming radiation transmitting region;
   a means forming radiation receiving region;
   a source of radiation coupled to said radiation transmitting region;
   a radiation sensitive means coupled to said radiation receiving region;

a light conductor having a surface generated by rotation of a curve having a progressively decreasing radius of curvature about an axis of rotation, whereby said surface merges into a substantially-rounded, vertex-tip, measuring, surface area without the radius of surface curvature becoming zero at said vertex-tip, measuring, surface area, said surface defining a single radiation input and output window at an intersection of said surface with a plane normal to said axis of rotation, said vertex-tip, measuring, surface area having the function of contacting said fluids in said retainer to have its light transmitting properties modified thereby; and said radiation transmitting region and said radiation receiving region being located on the opposite side of said window from said vertex-tip measuring-point surface area, and on substantially diametrically opposite sides of a center of said window, said radiation transmitting region radiating light through said window toward said vertex-tip measuring-point surface area and said radiation receiving region receiving light passing through said window from said vertex-tip measuring-point surface area, such that said radiation transmitting region and said radiation receiving region thereby being arranged that said radiation sensitive means receives predominantly light which is reflected from said vertex-tip measuring-point surface area.

2. Apparatus as claimed in claim 1 wherein said surface of said light-conductor is the external surface of said light conductor and wherein said fluid retainer is separate from said light conductor and forms a cavity into which said vertex-tip measuring-point surface area extends.

3. Apparatus as claimed in claim 2 wherein said light conductor is formed of a bar, and the shape of said surface is generated by rotation of an asymptotic curve, while the vertex region of said curve constitutes said vertex-tip, measuring, surface area.

4. Apparatus as claimed in claim 2 wherein said surface is profiled, in the shape of an asymptotic curve, while the vertex region of said surface of rotation constitutes said measuring-point surface area.

5. Apparatus as claimed in claim 1 wherein said light conductor defines a cavity and thereby forms said fluid retainer which is adapted to be filled with fluid having a refractive index to be determined.

6. Apparatus as claimed in claim 5 wherein said surface is the surface of said cavity and is profiled, in the shape of an asymptotic curve while a vertex region of said curve constitutes the vertex-tip, measuring, surface area.

7. Apparatus as claimed in claim 5 wherein said surface is profiled, in the shape of an asymptotic curve, while a vertex region of said rotational body constitutes the vertex-tip measuring, surface area.

8. Apparatus as claimed in claim 1 wherein said source of radiation includes two radiating members, having different emission wavelength concentrations and wherein light originating in said respective members alternately enters said light conducting means in timed sequence.

9. Apparatus as claimed in claim 8 wherein said radiation members are respectively adapted to be alternately switched on and the light produced by each of them has a different wavelength concentration than the other.

10. Apparatus as claimed in claim 9 wherein said radiating members are formed as a structural unit containing a radiant generator generating radiation of a plurality of wavelengths, as well as color filters adapted to be alternately placed in the output path of said radiant generator.

11. Apparatus as claimed in claim 1 wherein said source of radiation is adapted to emit radiation of a plurality of wavelengths, and where a further radiation sensitive element is provided which has a sensitivity-of-wavelength response differing from the sensitivity-of-wavelength response of said first radiation sensitive element.

12. Apparatus as claimed in claim 11 wherein the differing sensitivity-of-wavelength responses of said radiation sensitive elements are produced by placing differing color filters in the input paths of said radiation sensitive elements.

* * * * *